United States Patent [19]
Lee et al.

[11] Patent Number: 5,626,383
[45] Date of Patent: May 6, 1997

[54] IMPROVED WIRELESS WEATHERSTRIP PROFILES

[75] Inventors: Ching-Chih Lee, Hudson; Richard A. Miranda, Berlin Center; James F. Stevenson, Hudson, all of Ohio

[73] Assignee: GenCorp Inc., Fairlawn, Ohio

[21] Appl. No.: 365,718

[22] Filed: Dec. 28, 1994

[51] Int. Cl.$^6$ .................................................. B62D 25/00
[52] U.S. Cl. ...................... 296/146.9; 296/93; 49/490.1
[58] Field of Search ........................... 296/146.9, 93; 49/490.1

[56] References Cited

U.S. PATENT DOCUMENTS

| | | |
|---|---|---|
| 3,333,381 | 8/1967 | Stark et al. . |
| 4,193,605 | 3/1980 | Josephson .................. 296/93 X |
| 4,263,750 | 4/1981 | Hein . |
| 4,370,832 | 2/1983 | Koike . |
| 4,461,507 | 7/1984 | Minami et al. . |
| 4,530,186 | 7/1985 | Guillon . |
| 4,617,220 | 10/1986 | Ginster . |
| 4,619,077 | 10/1986 | Azzola et al. . |
| 4,676,856 | 6/1987 | Shigeki et al. . |
| 4,678,227 | 7/1987 | Castagno . |
| 4,702,039 | 10/1987 | Bocchinfuso . |
| 4,745,016 | 5/1988 | Hashimoto et al. . |
| 4,756,944 | 7/1988 | Kisanuki . |
| 4,787,668 | 11/1988 | Kawase et al. . |
| 4,813,733 | 3/1989 | Gustafson et al. . |
| 4,819,381 | 4/1989 | Kitaura et al. . |
| 4,848,035 | 7/1989 | Sakuma et al. . |
| 4,851,067 | 7/1989 | Ogawa et al. . |
| 4,854,079 | 8/1989 | Karibe et al. . |
| 4,891,409 | 1/1990 | Kuan et al. . |
| 4,929,490 | 5/1990 | Iwasa . |
| 4,949,507 | 8/1990 | Vaughan . |
| 4,952,442 | 8/1990 | Warner . |
| 4,959,081 | 9/1990 | Mathellier . |
| 4,970,102 | 11/1990 | Guillon . |
| 4,989,369 | 2/1991 | Maass . |
| 4,989,371 | 2/1991 | Mancosu et al. . |
| 5,007,202 | 4/1991 | Guillon . |
| 5,014,464 | 5/1991 | Dupuy et al. . |
| 5,032,444 | 7/1991 | Desir, Sr. . |
| 5,038,522 | 8/1991 | Nozaki . |
| 5,042,201 | 8/1991 | Vaughn . |
| 5,050,349 | 9/1991 | Goto et al. . |
| 5,067,281 | 11/1991 | Dupuy . |
| 5,072,546 | 12/1991 | Ogawa . |
| 5,106,149 | 4/1992 | Glossop, Jr. et al. . |
| 5,143,760 | 9/1992 | Mistopoulos . |
| 5,469,667 | 11/1995 | Le Marrec .................. 296/146.9 X |

FOREIGN PATENT DOCUMENTS

| | | | |
|---|---|---|---|
| 627333 | 12/1994 | European Pat. Off. ............ 296/146.9 |
| 2519399 | 7/1983 | France ................................ 296/146.9 |
| 358156415 | 9/1983 | Japan ................................. 296/146.9 |
| 360082463 | 5/1985 | Japan ................................. 296/146.9 |

OTHER PUBLICATIONS

"Foamable Hot Melt Weatherstrip Sealant", National Starch and Chemical Company, (Oct. 1, 1990).

Primary Examiner—Joseph D. Pape
Attorney, Agent, or Firm—Robert F. Rywalski; Louis J. Weisz

[57] ABSTRACT

A weatherstrip seal comprises a carrier structure without embedded reinforcement that has an attached weather-sealing structure extending therefrom. The carrier structure has two spaced-apart legs connected by a base, the interior walls of the legs forming a channel therebetween. Finger-like members extending from the walls are adapted to frictionally engage and hold a mounting flange inserted into the channel. The legs decrease in thickness as they proceed outwardly from the base and their walls converge inwardly toward each other, minimizing the material required for fabrication of the carrier and enhancing its ability to withstand forces acting to dislodge the mounting flange from the channel, especially at corners thereof.

5 Claims, 1 Drawing Sheet

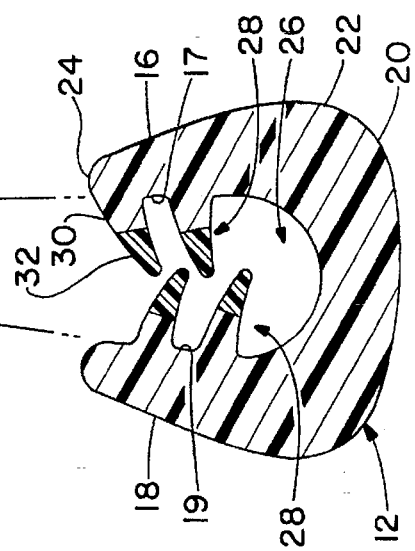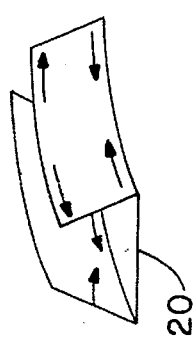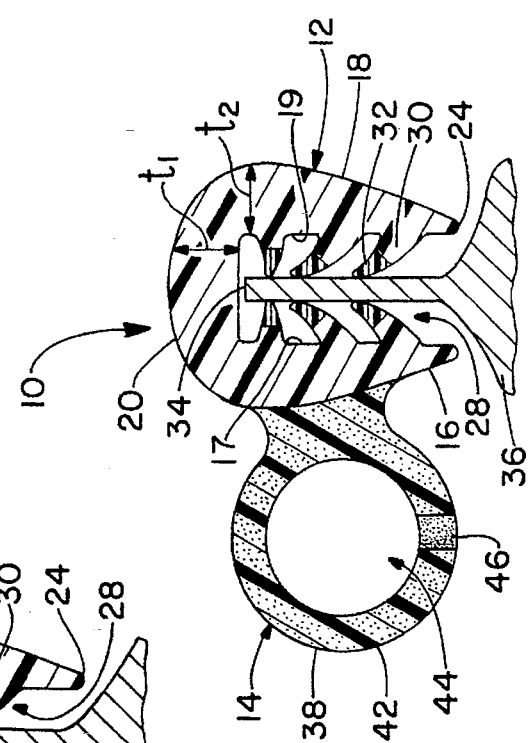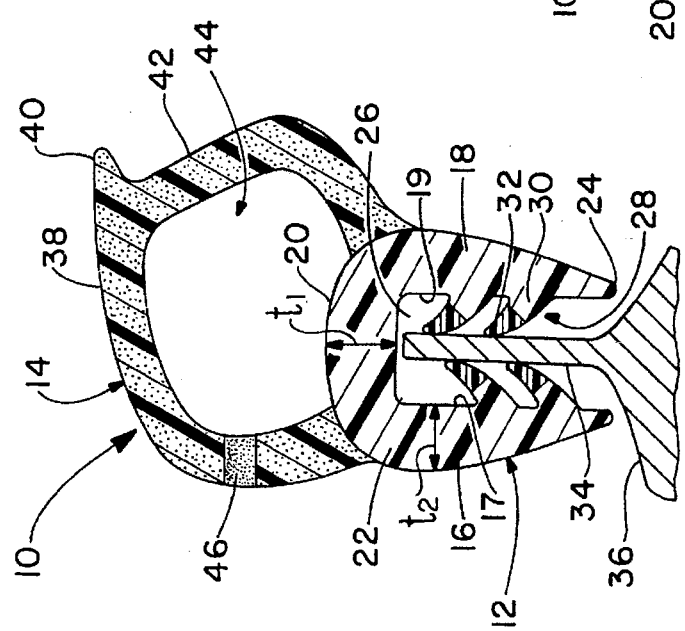

IMPROVED WIRELESS WEATHERSTRIP PROFILES

TECHNICAL FIELD

This invention relates to improved weatherstrip profiles. More particularly, this invention relates to weatherstrip profiles used for sealing movable components, especially for sealing closures furnished as coverings for openings providing access to enclosed areas in automobiles, trucks and other vehicles. Specifically, this invention relates to unreinforced weatherstrip profiles that conserve the material required for their fabrication, and that can be shaped and then heat-set into angled configurations that display improved retention with respect to mounting flanges on which the profiles are installed.

BACKGROUND OF THE INVENTION

In many instances where an object is fabricated from several components, there is a need for the points of juncture of the components to be sealed in order to provide the area enclosed by the components with protection, for instance, from penetration by the elements. Such sealing needs are, for instance, exemplified in the case of vehicles by a need to seal the juncture between the doors, trunk lids, and hoods, and the enclosed spaces associated therewith. Such sealing is typically accomplished by the presence of profile strips that include a relatively soft portion, which forms the weatherproof seal, and a harder portion, which serves as a carrier for the sealing portion. The carrier portion is commonly provided with a channel formed between two opposed walls connected by a base, designed to accept the insertion of the flange fabricated, for instance, from the sheet metal used to form the vehicles, the flange being located around the enclosed space to be protected.

The method for attaching such profiles involves the placement of the profile channel over the flange, the profile being retained by the frictional force of the channel walls against the flange. In most instances, finger-like projections extend from the opposed walls which frictionally engage the flange, further enhancing resistance to removal of the profile therefrom. When positioned as described, the sealing portion of the profile, which extends from a carrier portion, is desirably held in a sealing position.

While the installation of profiles of the type referred to is readily accomplished, the continual forces applied to the profiles as a consequence of the repeated opening and closing of the doors, trunk lids, hoods and the like have a tendency, especially in warm weather, to gradually loosen from the flanges on which they are mounted even when the profiles are provided with flange-engaging fingers, such loosening often leading to separation from the flanges.

As a consequence of the foregoing, weatherstrip profiles of the type described are commonly fabricated with reinforcement, for example, with reinforcing metal or equivalent material embedded or encased in the carrier. This type of construction, together with the use of dense rubber employed in forming the channel is designed to improve the gripping action of the channel on the flange over which the channel is positioned. However, while the reinforcement-containing carriers are normally available in a range of configurations and sizes that can be individually designed to provide both the required retention and sealing functionality, such devices nevertheless have certain inherent disadvantages that are difficult to avoid.

Among these disadvantages may be mentioned the extra cost of fabricating reinforced sealing profiles, including the cost of the added operations required for their fabrication compared to unreinforced profiles, as well as the cost of the additional inventory involved. Also profiles extruded with reinforcing wire tend to protrude slightly at the wire locations, resulting in an unsightly series of raised ribs. Furthermore, sealing profiles are difficult to install around small radius corners without buckling or wrinkling, an effect giving rise to sealing leaks. In addition, when the channel walls of the sealing are parallel to, or divergent from each other, the profiles have an unfortunate tendency to spread apart as they traverse the corners of flanges on which they are mounted. This necessarily results in a decrease in the frictional force with which the walls or fingers grip the flanges, thus increasing their tendency to become separated from flanges on which they are mounted.

A still further disadvantage of wire-reinforced profile seals resides in the fact that they cannot be shaped longitudinally by curved extrusion technology as disclosed in U.S. Pat. No. 4,906,171 and U.S. Pat. No. 5,069,853, nor can extrusion dies be changed rapidly as described in U.S. Pat. No. 5,067,885.

In view of the preceding, therefore, it is a first aspect of this invention to provide an improved weatherstrip seal profile.

A second aspect of the this invention is to provide weatherstrip seals that require less rubber to make and thus are less expensive to produce than many of those of the prior art.

Another aspect of this invention is to provide heat-set weatherstrip seal profiles that have the ability to traverse relatively small radii without wrinkling or buckling.

Another aspect of this invention is to provide unreinforced weatherstrip seals that can be anchored as securely to the mounting flanges with which they are associated as weatherstrip seals that are fabricated with encased reinforcement.

A further aspect of this invention is to provide weatherstrip seals characterized by their ability to grip flanges on which they are mounted more securely in areas of flange curvature.

An additional aspect of this invention is to provide weatherstrip seals that include carriers that have no reinforcement, particularly metal reinforcement therein, thereby providing a cost savings over seals of the prior art.

A still further aspect of this invention is to provide weatherstrip profiles with a smoother and more attractive appearance by elimination of wire reinforcement therefrom.

Another aspect of this invention is to provide profiles unreinforced with wire adapted to fabrication by methods capable of employing corner extrusion technology and rapid die change procedures.

Yet another aspect of this invention is to provide a weatherstrip profile that can be heat-set in the configuration required for installation on a particular mounting flange.

BRIEF DESCRIPTION OF THE INVENTION

The preceding and still further aspects of the invention are provided by improvements to profiles of the prior art comprising a carrier structure having two legs with opposing walls defining a channel therebetween, connected by a base. The walls have a plurality of inwardly extending fingers possessing a root portion and a tip portion, the root portions being attached to the walls and the tip portions being attached to the root portions, the fingers having the ability to grip a profile-mounting flange positioned in the channel.

Extending from the carrier, and attached thereto, is a weather-sealing structure that is provided with a sealing surface. The improvements of the invention include a carrier fabricated with legs that decrease in thickness as they proceed outwardly from the base. In addition or alternatively, the opposing walls of the carrier converge inwardly toward each other as they proceed from the base.

The preceding and yet other aspects of the invention are provided by improvements to the profiles of the prior art described in the preceding paragraph comprising a carrier whose legs decrease in thickness as they proceed outwardly from the base.

The walls of the profile converge inwardly as they proceed from the base at a convergence angle of from about 5°–60°. The legs, base, and finger root portions having a Shore A durometer hardness of about 70–100, while the finger tip portions have a Shore A hardness of about 40–55.

The preceding and still additional aspects of the invention are provided by a vehicle fabricated with a profile having the improvements described in the preceding paragraphs.

BRIEF DESCRIPTION OF THE DRAWINGS

The invention will be better understood when reference is had to the following figures, in which like-numerals refer to like-parts, and in which:

FIG. 1 is a cross-sectional view of a profile of the invention fixed on a mounting flange.

FIG. 2 is a schematic illustration of the forces acting on the carrier structure of FIG. 2A as it traverses a bend in a curved flange.

FIG. 2A is a cross-sectional view of a carrier structure of the invention by itself.

FIG. 3 is a cross-sectional view of a different profile of the invention fixed on a mounting flange.

DETAILED DESCRIPTION OF THE INVENTION

FIG. 1 is a cross-sectional view of a profile of the invention, generally 10, mounted on a mounting flange 34. As shown, the profile 10 comprises a carrier structure, generally 12, from which a seal structure, generally 14, extends. The seal structure 14 of the Figure has a bulbular configuration in which resilient walls 42 enclose a space 44. A vent hole 46 is shown through which air enters or leaves the enclosed space 44, depending on whether the weatherstrip seal is being expanded or compressed, the figure illustrating the expanded position. The outer surface 38 of the seal structure serves as a sealing surface, which in the embodiment shown has an extending lip 40 that serves as an extension of the surface.

The bulbular seal structure 14 extends from, and is integrally attached to carrier structure 12. The latter structure comprises a base 20 having a thickness $t_1$, connecting two legs 16 and 18 having a maximum thickness $t_2$. The thicknesses $t_1$ and $t_2$ should be of comparable magnitude. The legs 16 and 18 have opposed walls 17 and 19 on the interior thereof from which "fingers" 28 extend into a carrier channel 26 formed between the two walls. Each of the fingers includes a root portion 30 attached to one of the interior walls 17 or 19, and desirably a tip portion 32 attached thereto. Extending into the carrier channel 26 and engaged by the tip portions 32 is a mounting flange 34, which is an extension of the sheet metal body 36 with which the weatherstrip 10 is associated.

Conveniently, to facilitate manufacture of the dies where the profiles of the invention are formed by extrusion, the dies will be configured in a form designed to provide a relatively open channel 26; the legs 16 and 18 of the extruded profile thereafter being shaped into the desired convergence angle by treatment with compression rollers (not shown).

Among other things, the thickness of the seal wall 42 determines the force that must be exerted on the weatherstrip seal 10 in order to effect a sealing relationship between the components to be sealed. The wall thickness may vary within fairly broad limits; however, in the profiles of the invention the walls will usually be from about 1 to 3 mm thick.

With respect to the vent holes 46, a sufficient number will be provided to facilitate the passage of air during compression and expansion of the weatherstrip seal 10 when components are being sealed or unsealed, as for example, when an automobile door or trunk lid is closed or opened. Typically, the vent holes 46 will be spaced from about 6 to 12 inches apart and will be dimensioned to provide good air flow therethrough.

A further advantage of the invention disclosed herein arises from the discovery that the tendency of a weatherstrip to tighten or loosen its grip in tracking around a corner flange can be controlled by the design geometry of the weatherstrip. In this regard, it has been found that by designing the legs 16 and 18 of the carrier 12 so that they converge as they proceed outwardly from the base, the carrier legs, and therefore the fingers 28 projecting from their interior walls 17 and 19 are forced more firmly, particularly in corner regions, against the mounting flange 34 on which the carrier is mounted. The result is explained by the fact that as shown in the schematic illustration of FIG. 2, as the weatherstrip is curved about a radius, the tip portions 24 of the legs 16 and 18 being at a greater radius than the base of the legs 22, are stretched longitudinally while the base of the legs is compressed longitudinally. Such stretching is relieved by the upper portion of the legs moving closer to the base 20, i.e., forcing them and their associated fingers 28 more tightly against the flange 34. The increase in gripping pressure is reflected in the increased force required to disengage the carrier from the mounting flange 34.

The convergence described is also shown in FIG. 2A, which illustrates a cross-sectional view of a carrier structure of the invention by itself. As shown, carrier legs 16 and 18, connected by a base 20, have fingers 28 comprising a root portion 30 and a tip portion 32 extending from opposing interior walls 17 and 19. As shown by the Figure, opposing walls 17 and 19 converge at a convergence angle θ. The convergence of the walls 17 and 19 not only improves retention of the carrier on the mounting flange 34 in curved areas of the flange, but minimizes the tendency of carriers, compared to those in which the walls are parallel to each other, to buckle and open up when traversing curves thereby reducing their flange-gripping force, a consequence which may result in the formation of leaks. The angle of convergence, i.e., the angle formed between the converging opposing walls 17 and 19, may be varied relatively broadly; however, it has been found that in order to realize the benefits described herein, the angle should vary from about 5° to 60°, and should preferably be about 30°.

Profiles of the invention can be molded, extruded, or coextruded in ways well known to those skilled in the art. Desirably, materials employed for fabricating the profiles, particularly the carrier and finger root portions of the profiles will include relatively hard compounded blends of thermoplastic with elastomeric compounds, thermoplastic elastomers or other materials capable of being heat-set. Heat-setting is accomplished by shaping the profiles into desired configurations, heating the profiles to the heat-setting temperature for a sufficiently long period of time which depends on the means of heating, the compound compositions, the profile geometry, and thickness, and then cooling the profiles to room temperature or the temperature of the profiles' use while still shape restrained. Alternatively, the profiles may be heated first and then shaped. After cooling, the restraints are removed and the profiles substantially maintain the desired configurations. Advantageously, elastomeric materials such as natural rubber, EPDM, SBR and others will be used to form the finger tip portions of the profiles.

The following recipe, in which the ingredients are shown in parts by weight, has been found to be particularly effective for purposes of the invention, for example, in forming the carrier structure 12 and the finger root portions 30.

| ELASTOMER | |
| --- | --- |
| Nordel 2722[1] EPDM | 92 |
| Nordel 2744[1] EPDM | 4 |
| Nordel 1660[1] EPDM | 4 |
| THERMOPLASTIC | |
| Escorene LD138-13[2] LD Polyethylene | 20 |
| REINFORCEMENT | |
| Suprex Clay | 28 |
| Austin Black | 35 |
| Black N762 | 95 |
| OIL | |
| Sunpar 2280 | 12 |
| CURATIVES AND ANTIDEGRADANTS | |
| ZnO | 5 |
| Stearic Acid | 1.5 |
| Sulfur | 2.75 |
| MBT(S) Accelerator | 1.25 |
| Tetrone A[1] Accelerator | 0.75 |
| Calcium Oxide HP | 2 |
| TMTD Accelerator | 0.75 |
| Total Parts | 304 |

[1]DuPont Co.
[2]Exxon Corp.

FIG. 3 is a cross-sectional view of a different profile of the invention fixed on a mounting flange. As shown, the profile 10 comprises a carrier structure 12 to which is attached a seal structure 14. Unlike FIG. 1, the seal structure 14 is attached to the side of one of the legs 16 of the carrier, rather than from its base 20. The position of the seal structure 14 relative to the carrier 12 may vary from one application to another. For example, a seal structure attached to the base of the carrier as in FIG. 1 may be more appropriate for a trunk lid weatherstrip, while a seal structure attached to one side of the carrier as in FIG. 3 may be more appropriate for a primary door weatherstrip. As in the case of FIG. 1, the carrier 12 comprises two legs 16 and 18, connected by a base 20, having fingers 28 extending from opposing walls 17 and 19.

The fingers 28 include a root portion 30 attached to the walls 17 and 19, the root portion having a tip portion 32 attached thereto.

An important feature of the carrier of the invention is that the thickness of the legs 16 and 18 decreases from the portion 22 adjacent to the base 20 to the tip portion 24. When the fingers 28 and thus the legs 16 and 18 are subjected to forces attempting to remove the carrier from its mounting flange, the bending moment along the legs, which tends to open up the channel 26, is highest near the base 20 and lowest at the tip 24. To meet the design requirement of high extraction force, i.e., being difficult to remove the seal from the mounting flange, the legs should be rigid enough so that the tendency of the channel to open is minimal during an extraction. Tapering the thickness along the legs as shown in the figures, that is, having the largest thickness at the location with the highest bending moment and the smallest thickness at the location with the lowest bending moment, minimizes the tendency for the legs to separate for a given cross-sectional area of the carrier. This means that for the same carrier cross-sectional area, the profile with tapered leg thickness will have a desirable higher extraction force compared to other profiles with uniform leg thickness. Equivalently, for the same channel rigidity, the profile with a tapered leg thickness will have the smallest carrier cross-sectional area, and thus conserve the material required to fabricate the carrier.

The seal structure 14 of FIG. 3 is comparable to that shown in FIG. 1. For example, the bulbular structure comprises a wall 42 which contains a vent hole 46 and has an outer surface 38 that serves as a sealing surface. The wall 42 encloses a space 44, air leaving or entering the space, depending upon whether the seal is being compressed or expanded.

With respect to the fingers 28, the same extend from both opposing walls 17 and 19, and may be opposite each other as shown in FIG. 3, or staggered as illustrated in FIG. 1. Furthermore, it is preferred that at least some of the fingers 28 point in the direction of the base 20 since such a configuration tends to make the fingers resist withdrawal of the flange by subjecting them to deformation and buckling if such removal is attempted. Clearance of the finger tips 32, which can be fabricated with a wide variety of dimensions, on an opposing wall, 17 or 19, relative to the tips extending from the other wall will depend upon the thickness of the mounting flange 34.

In order to achieve maximum retention, as measured by the force required to extract the carrier from the flange 34, it is preferred that the fingers 28 include both a root portion 30 and tip portion 32, the latter constituting from 0 to 100 percent of the length of the fingers.

It is also preferred that the tip portion 32 of the finger be softer than the root portion, for example, it has been found desirable to employ tip portions having a Shore A hardness of about 40–55, while the root portions 30 will have a Shore A hardness of about 70–100 to provide the rigidity required to retain the carrier firmly on the flange. Ordinarily, from two to six fingers will be provided, with four fingers being preferred.

While the carrier, seal structure and finger root portion of the weatherstrip seal profiles of the invention can be fabricated from a wide variety of materials including such things as thermoplastic, elastomers, and thermoplastic elastomers, for example, from EPDM, neoprene, SBR, polypropylene, Santoprene, the latter being a product marketed by Advanced Elastomer Systems, and others, the tip portion of the fingers advantageously will be formed from elastomeric materials such as natural rubber, EPDM, SBR, a thermoplastic elastomer, and the like.

The dimensions of the carrier typically will include a base 20 having a width of about ¼ to ⅝ inch, with a thickness of approximately 1/16–5/16 inch. The legs will commonly be about ¼ to ¾ inch in height, and will have a maximum thickness from about 1/16 to ¼ inch.

In order to maintain the rigidity required to obtain maximum retention of the carrier 12 on the flange 34, the legs 16 and 18, and the base 20 of the carrier will ordinarily have a Shore A hardness of from about 70 to 100. In the case of the bulbular embodiment 14 shown in FIGS. 1 and 3, the walls 42 will conveniently be formed from sponge-like, foamed compounds, as well as soft, dense compounds. While only bulbular seal structures are illustrated, the precise shape and dimensions of the seal structures may be varied within a relatively wide range.

Where the seal structure 14 is a sponge-like foamed compound, the following recipe, in which the ingredients are represented in parts by weight, will provide satisfactory results insofar as the invention is concerned.

| | |
|---|---|
| Vistalon 6505 EPDM[1] | 100 |
| Stearic Acid | 1 |
| Zinc Oxide | 5 |
| FEF Carbon Black (N550) | 30 |
| SRF Carbon Black (N774) | 60 |
| Whiting | 35 |
| Mistron Vapor Talc[2] | 35 |
| Sunpar 2280 Oil[3] | 80 |
| Sulfur | 2.00 |
| Kempore 150 Blowing Agent[4] | 6.00 |
| TELLURAC RODFORM Accelerator | 1.00 |
| METHYL ZIMATE Accelerator | 1.25 |
| BUTYL ZIMATE Accelerator | 1.25 |
| THIATE U (Dibutylthiurea)[5] | 2.50 |

[1]Exxon Chemical Co.
[2]Cyprus Industries
[3]Sun Oil Co.
[4]Uniroyal Chemical Co.
[5]Elastochem Co.

While foamed sponge compounds such as that shown in the preceding recipe are often preferred, other non-foam compounds of the types well known in the art may also be used for the seal structure. When such recipes are employed, the material produced, which is typically softer than that used for the carrier and root portions, may advantageously also be used for the tip portions of the fingers. An example of a typical recipe in which the ingredients shown are in parts by weight is as follows.

| | |
|---|---|
| SMR-5 Natural Rubber | 100.00 |
| Flectol H Antioxidant | 1.50 |
| Santoflex 13 Antioxidant[1] | 2.50 |
| Sun Anti Check Wax[2] | 1.00 |
| ZnO | 5.00 |
| Stearic Acid | 2.00 |
| Carbon Black N762 | 15.00 |
| Carbon Black N339 | 30.00 |
| Sunpar 2280 Oil[2] | 12.00 |
| Sulfur | 0.80 |
| Santocure Accelerator[1] | 2.5 |
| MBTS Accelerator | 0.50 |

[1]Monsanto Chemical Co.
[2]Sun Oil Co.

Following their fabrication, the profiles may be coated with lubricants, for example, urethane, or others to facilitate the sealing process as the components to be sealed are joined.

In addition to the superior sealing characteristics, the profiles of the invention exhibit flange retention comparable to that achieved by profiles with embedded reinforcing, for example, metal.

While in accordance with the Patent Statutes, a preferred embodiment and best mode has been presented, the scope of the invention is not limited thereto, but rather is measured by the scope of the attached claims.

What is claimed is:

1. A weatherstrip profile, comprising;

a carrier structure having two legs with opposing walls defining a channel therebetween and being connected by a base, said walls having a plurality of inwardly extending fingers each having a root portion and a tip portion, said root portions being attached to said walls and said tip portions being attached to said root portions, said fingers being adapted to grip a profile-mounting flange positioned in said channel, a weather-sealing structure having a sealing surface, said weather-sealing structure extending from said carrier structure and being attached thereto, said carrier legs decreasing in thickness as they proceed outwardly from said base, said walls converging towards each other as they proceed from said base at a convergent angle of from about 5°–60°, and said legs, base, and root portions having a Shore A durometer hardness of about 70–100.

2. A profile according to claim 1 in which said tip portions have a Shore A durometer hardness of about 40–55.

3. A profile according to claim 2 that includes from about 2–6 fingers.

4. In a weather-sealing profile including:

a carrier structure having two legs with opposing walls defining a channel therebetween and being connected by a base, said walls having a plurality of inwardly extending, opposed fingers each having a root portion and a tip portion, said root portions being attached to said walls and said tip portions being attached to said root portions, said fingers being adapted to grip a profile-mounting flange positioned in said channel, and a weather-sealing structure having a sealing surface, said weather-sealing structure extending from said carrier structure and being attached thereto, the improvement wherein the carrier is fabricated without reinforcement therein, said legs decrease in thickness as they proceed outwardly from said base, and wherein said walls converge toward each other at a convergence angle of from about 5°–60°, wherein further, said walls, base, and root portions have a Shore A durometer hardness of about 70–100, while said tip portions have a Shore A durometer hardness of about 40–55.

5. A weather-sealing profile according to claim 4 in which said weather-sealing structure comprises a flexible wall enclosing a space, said wall having an outer surface and being provided with at least one vent opening, said outer surface functioning as said sealing surface.

* * * * *